United States Patent [19]

Miller

[11] 4,005,465
[45] Jan. 25, 1977

[54] TUNNEL EMITTER PHOTOCATHODE

[75] Inventor: Brian S. Miller, Alexandria, Va.

[73] Assignee: The United States of America as represented by the Secretary of the Army, Washington, D.C.

[22] Filed: May 30, 1975

[21] Appl. No.: 582,545

Related U.S. Application Data

[62] Division of Ser. No. 476,248, June 4, 1974, Pat. No. 3,913,218.

[52] U.S. Cl. .................................. 357/6; 357/30; 357/52
[51] Int. Cl.² ................... H01L 49/02; H01L 27/14
[58] Field of Search .................. 357/6, 30, 52, 12

[56] References Cited

UNITED STATES PATENTS

| 3,184,636 | 5/1965 | Dore | 315/94 |
| 3,493,767 | 2/1970 | Cohen | 250/211 |
| 3,706,920 | 12/1972 | Caldwell | 317/234 R |

Primary Examiner—Martin H. Edlow
Attorney, Agent, or Firm—Nathan Edelberg; Max L. Harwell; Robert P. Gibson

[57] ABSTRACT

A method of producing a tunnel emitter photocathode consisting of heating a semiconductor layer and then depositing a layer of aluminum oxide on one side thereof at a rapid rate and then baking out the wafer in a hydrogen gas atmosphere. After depositing electrical contacts on each side of the wafer, a metallic emitter layer is evaporated over the aluminum oxide layer with the metallic emitter layer treated with a low work function material such as cesium and oxygen to further increase the emission efficiency.

5 Claims, 1 Drawing Figure

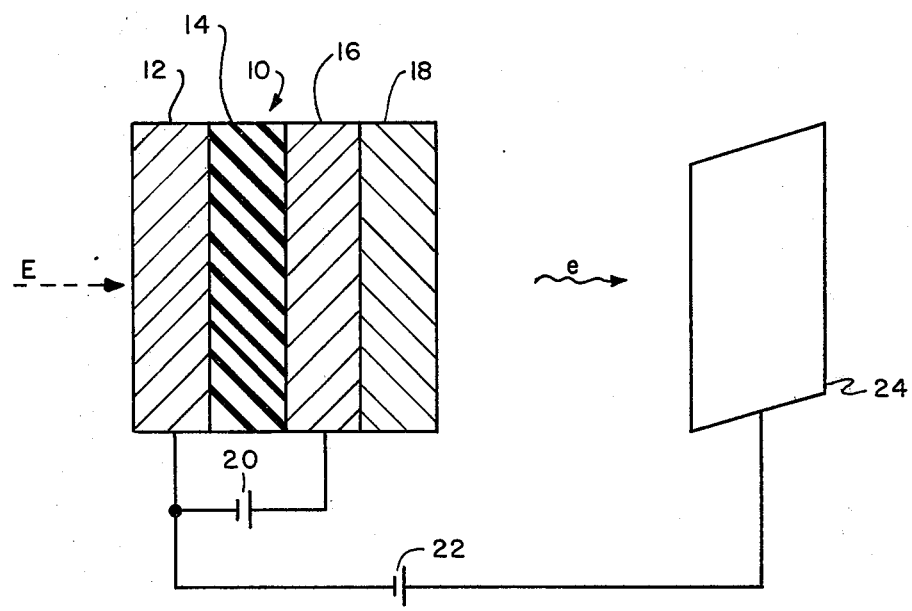

TUNNEL EMITTER PHOTOCATHODE

The invention described herein may be manufactured, used, and licensed by or for the Government for governmental purposes without the payment to me of any royalty thereon.

This is a division of application Ser No. 476,248, filed June 4, 1974, now U.S. Pat. No. 3,913,218.

BACKGROUND OF INVENTION

The present invention is in the field of cold cathode tunnel emitter devices that convert light energy to photoelectrons for light imaging, intensifying, detection, or control purposes.

Although the principle of such devices has been known for some time, useful device characteristics have not been obtained due principally to the loss of electrons in the insulator and emitter layers during the tunneling and emitting process and also a tendency for rapid breakdown and shorting of the insulator layer at the high electric fields required thereacross to obtain high tunneling efficiency.

SUMMARY OF INVENTION

The present invention comprises a method of producing and the resulting apparatus of a tunnel emitter photocathode that overcomes the problems stated above that exists in the prior art.

The semiconductor layer may be made of any semiconductor material suitable to detect the desired light wavelength. The rapid deposition of an aluminum oxide layer on one side of the semiconductor layer and then the baking out of the wafer in hydrogen gas for an extensive period prior to applying subsequent layers of silver and cesium oxide overcomes the limitations of the prior art photocathode.

BRIEF DESCRIPTION OF THE DRAWING

The FIGURE is a cross-section of the tunnel emitter photocathode of the present invention.

DETAILED DESCRIPTION OF THE PREFERRED EMBODIMENT

In reference to the FIGURE, the cross-sectioned tunnel emitter photocathode of the present invention is shown schematically in the environment which it operates. This device has been demonstrated to eject a higher number of electrons out the low work function material 18 toward collector 24 than in prior art tunnel emitters.

The tunnel emitter photocathode 10 produced by the present method has a semiconductor layer 12 to detect light radiation thereon and an insulating layer 14 contiguous therewith on one side. A thin metallic emitter layer 16 is contiguous with insulating layer 14, and a low work function material layer 18, such as alternate layers of cesium and oxygen, is deposited on layer 16. A first bias voltage source 20 is connected to layers 12 and 16 such that electrons generated in the semiconductor layer 12 by photons impinging thereon are tunnelled through insulating layer 14 into the thin metallic emitter layer 16. A second bias voltage source 22 provides an electron acceleration bias on collector 24 that accelerates electrons from low work function layer 18 through the vacuum between layer 18 and collector 24. Light radiation from either side, i.e. directly onto layer 12 or through layers 18, 16, and 14 and then onto layer 12, creates electron hole pairs in layer 12.

The method of producing this tunnel emitter photocathode is as follows. The material of semiconductors layer 12 is the type used in previous photocathodes. Layer 12 may be a convenient material for detecting light radiation, such as silicon, but may be other materials that are suitable for detecting specific wavelengths, such as at infrared. The silicon is p-type material that has a resistivity of 10 ohm-centimeters. A particular combination of insulating material 14, the treatment of this insulating material, and the emitting layer are explained hereinbelow.

An amorphous layer of aluminum oxide ($Al_2O_3$), represented by numeral 14, is deposited on the semiconductor layer 12 by a chemical vapor deposition process using aluminum trimethyl and oxygen in a chamber suitable for heating the semi-conductor layer 12 to about 450° C. The aluminum trimethyl and oxygen, which are both gases, are diluted with a high volume of nitrogen gas, which is used as on inert carrier gas. The flow rate of this gas mixture into the chamber is adjusted to give a rapid rate of oxide deposition on layer 12. Typically, a deposit rate of about 2,000 A thickness per minute is used with a thickness of between 500 and 1,000 A being deposited. The resulting wafer that includes the insulating layer 14 of aluminum oxide on the semiconductor layer 12 is placed in a furnace having a hydrogen gas atmosphere and is typically heated to 650° C. for 18 hours. After this treatment, the wafer is placed in a vacuum environment and suitable electrical contacts are deposited by evaporation of metal on layer 12 and the outer portion of layer 14. An emitter layer 16 is then deposited over the electrical contact on the outer portion of layer 14 by evaporating thereon in an ultra high vacuum system. This emitter layer 16 is a metal, such as silver and is integral with the electrical contact. Layer 16 is optically semi-transparent and is about 100 to 500 A thick. A low work function layer 18 is deposited on layer 16. Layer 18 may be alternate layers of cesium and oxygen that are deposited in the standard manner for photocathode activation to further increase the electron emission efficiency.

The tunnel emitter photocathode that is produced by the above method functions in the environment as shown by the FIGURE. That is, a first bias voltage source 20 with polarity as shown is connected to the electrical contacts connected to layers 12 and 16 and has a forward bias of about $10^7$ volts per square centimeter of the common area between layers 12 and 14. A second bias voltage source 22, of a few hundred volts value, is applied to collector 24 to accelerate electrons from layer 18 through the vacuum environment between low work function layer 18 and collector 24.

While only one embodiment of the invention has been disclosed, it is to be understood that variations in the details of fabrication, the materials used and the combination and arrangement of elements may be made while remaining within the spirit and scope of the invention which is limited only by the following claims.

I claim:
1. A tunnel emitter photocathode comprising:
   a layer of semiconductor material that converts light to photoelectrons, said semiconductor material having an electrical contact attached thereto;
   an amorphous aluminum oxide insulating layer contiguous with one side of said layer of semiconductor material;

a constant thickness metallic emitter layer contiguous with said insulating layer and having an electrical contact attached thereto;

a thin layer of low work function material contiguous with said metallic emitter layer; and a bias voltage source connected to electrical contacts attached to said semiconductor material and said metallic emitter layer wherein said bias voltage source produces an electric field across said insulating layer to tunnel electrons through said insulating layer and into said metallic emitter layer and out said thin layer of low work function material.

2. A tunnel emitter photocathode as set forth in claim 1 wherein said semiconductor material is silicon.

3. A tunnel emitter photocathode as set forth in claim 2 wherein said amorphous aluminum oxide insulating layer is 500 A to 1,000 A in thickness.

4. A tunnel emitter photocathode as set forth in claim 3 wherein said constant thickness metallic emitter layer is semitransparent silver of between 100 A to 400 A thickness.

5. A tunnel emitter photocathode as set forth in claim 4 wherein said thin layer of low work function material is cesium oxide.

* * * * *